United States Patent

Honguu et al.

[11] Patent Number: 4,579,777
[45] Date of Patent: Apr. 1, 1986

[54] OPTO-MAGNETIC RECORDING MEDIUM

[75] Inventors: Kazuoki Honguu; Mitsuharu Sawamura, both of Yokohama; Kazuhiko Kikuchi, Kawasaki, all of Japan

[73] Assignee: Canon Kabushiki Kaisha, Tokyo, Japan

[21] Appl. No.: 753,041

[22] Filed: Jul. 2, 1985

[30] Foreign Application Priority Data

Jul. 20, 1984 [JP] Japan ................................ 59-149328

[51] Int. Cl.$^4$ ................................................ G11B 7/24
[52] U.S. Cl. .................................... 428/336; 360/131; 360/135; 428/446; 428/461; 428/472; 428/693; 428/694; 428/900
[58] Field of Search ............... 428/694, 693, 900, 336, 428/446, 461, 472; 365/122; 360/131, 135

[56] References Cited

U.S. PATENT DOCUMENTS 4,489,139 12/1984 Ohta et al. ...................... 428/900

FOREIGN PATENT DOCUMENTS 175048 10/1984 Japan .............................. 428/325

Primary Examiner—George F. Lesmes
Assistant Examiner—William M. Atkinson
Attorney, Agent, or Firm—Fitzpatrick, Cella, Harper & Scinto

[57] ABSTRACT

An opto-magnetic recording medium comprises a light-transmitting substrate, a first protective layer comprising a metal film provided in contact with the substrate and transmitting therethrough almost all of a light entering through the substrate, a second protective layer formed of a dielectric material provided on the first protective layer, and a magnetic recording layer provided on the second protective layer and having information recorded or reproduced thereon by the light transmitted through the substrate and the first and second protective layers.

10 Claims, 3 Drawing Figures

OPTO-MAGNETIC RECORDING MEDIUM

BACKGROUND OF THE INVENTION

1. Field of the Invention

This invention relates to an opto-magnetic recording medium capable of recording or reproducing information by a light beam being applied thereto.

2. Description of the Prior Art

As opto-magnetic recording mediums, there are known mediums having as a recording layer a polycrystal thin film such as MnBi or MnCuBi, an amorphous thin film such as GdCo, GdFe, TbFe, DyFe, GdTbFe or TbDyFe, or a single crystal thin film such as $TbFeO_3$.

Of these thin films the amorphous thin film has recently been considered to be excellent as the recording layer of the opto-magnetic recording medium when the film forming property with which a thin film of a great area is made at a temperature in the vicinity of room temperature, the writing efficiency for writing signals with small opto-thermal energy and the reading-out efficiency for reading out the written signals at a good S/N ratio are taken into account. Particularly, the amorphous thin film GdTbFe has a great Kerr rotation angle and a curie point of about 150° C. and is therefore suitable as the recording layer. Further, as a result of the study continued in order to improve the Kerr rotation angle, it has been found that the amorphous thin film GdTbFeCo has a sufficiently great Kerr rotation angle and permits reading-out of a good N/S ratio.

Generally, however, magnetic materials used for the magnetic recording layer, including the amorphous magnetic alloys such as GdTbFe, have a disadvantage that they are poor in corrosion resistance. That is, when they are brought into contact with the atmosphere or steam, their magnetic characteristic is reduced and finally, they are comptetely oxidized and become transparent.

To eliminate such a disadvantage, there has heretofore been proposed a disc-like recording medium in which a protective layer formed of a dielectric material such as $SiO_2$, SiO or $Si_3N_4$ transmitting therethrough the recording light and the reproducing light is provided on each side of the magnetic recording layer and further, the magnetic recording layer is enveloped by inert gas.

As an example of such conventional opto-magnetic recording medium, there is known a medium in which, as shown, for example, in FIG. 3 of the accompanying drawings, a protective layer 2 formed of the dielectric material as previously mentioned is formed on a writing side substrate 1a and a magnetic recording layer 3, a spacer layer 4 and a reflection layer 5 are successively provided on the protective layer 2 and further the reflection layer 5 is cemented to a protective substrate 1b with an adhesive layer 6 interposed therebetween. However, where the magnetic recording layer 3 is as thin as several hundred Å, the magnetic characteristic thereof has sometimes been deteriorated in spite of the presence of the protective layer 2 and the spacer layer 4 if the medium is placed in a high humidity state for a long time. This is because, when the recording sensitivity and the reproducing efficiency are taken into account, the protective layer 2 and the spacer layer 4 cannot be formed to a sufficient thickness to completely prevent transmission of moisture or oxygen therethrough. The adherence property of the protective layer 2 such as $Si_3N_4$ with respect to the substrate 1a cannot be said to be satisfactory particularly where the substrate 1a is formed of a plastic material, and peel-off or crack has thus occurred and this has led to a problem in respect to durability.

SUMMARY OF THE INVENTION

It is an object of the present invention to provide an opto-magnetic recording medium which has high recording sensitivity and high reproducing efficiency and which is excellent in corrosion resistance and durability.

The above object of the present invention is achieved by constructing the opto-magnetic recording medium of a light-transmitting substrate, a first protective layer comprising a metal film provided in contact with said substrate and transmitting therethrough almost all of a light entering through said substrate, a second protective layer formed of a dielectric material provided on said first protective layer, and a magnetic recording layer provided on said second protective layer and having information recorded or reproduced thereon by the light transmitted through said substrate and said first and second protective layers.

DESCRIPTION OF THE PREFERRED EMBODIMENTS

Figure 1:
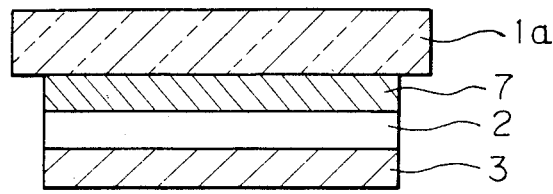
FIG. 1 is a schematic cross-sectional view showing an example of the construction of the opto-magnetic recording medium of the present invention.

The present invention will hereinafter be described in detail by reference to the drawings. FIG. 1 is a schematic cross-sectional view showing an example of the basic construction of the opto-magnetic recording medium of the present invention. This opto-magnetic recording medium comprises a substrate 1a, a first protective layer 7 comprising a metal film, a second protective layer 2 comprising a dielectric material film, and a magnetic recording layer 3.

Figure 3:
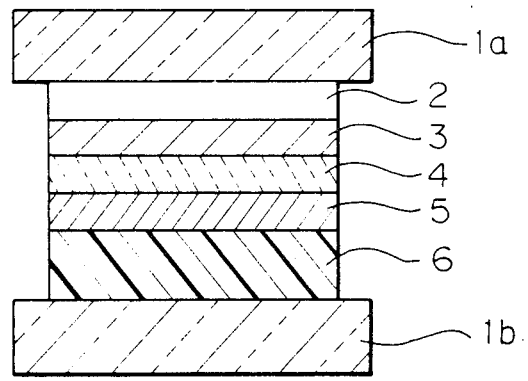
FIG. 3 is a schematic cross-sectional view showing an example of the construction of the conventional opto-magnetic recording medium.

The substrate 1a, the second protective layer 2 and the magnetic recording layer 3 may be formed of the same materials as those used in the conventional opto-magnetic recording medium shown in FIG. 3. For example, a plastic plate such as acrylic resin or polycarbonate or a glass plate may be used as the substrate 1a, a thin film formed of a dielectric material such as SiO, $SiO_2$, AlN, $Si_3N_4$ or $ZrO_2$ capable of improving corrosion resistance with the first protective layer 7 may be used as the second protective layer 2, and one of various magnetic thin films may be used as the magnetic recording layer 3. An amorphous magnetic thin film such as GdCo, GdFe, TbFe, DyFe, GdTbFe or TbDyFe having a readily magnetizable axis perpendicular to the surface of the film is preferable as the magnetic thin film. Above all, GdTbFe and GdTbFeCo which have a great Kerr rotation angle are particularly preferable.

The magnetic recording layer 3 is formed to a desired layer thickness within a range which performs the function as the recording layer, usually to a thickness of the order of 160–1000 Å. The layer thickness of the second protective layer 2 is variable in accordance with the layer thickness of the magnetic recording layer 3, and may be similar to or smaller than the layer thickness of the protective layer 2 of the conventional opto-magnetic recording medium shown in FIG. 3.

The first protective layer 7 comprises a metal film formed between the substrate 1a and the second protective layer 2. This first protective layer 7, with the second protective layer 2, performs the function of preventing the magentic recording layer 3 from being corroded by moisture or oxygen even if the substrate 1a absorbs moisture. That is, even if pin-holes are present in the second protective layer 2, the first protective layer 7 closes those pin-holes and the first protective layer 7 itself also prevents the transmission of moisture or oxygen to the magnetic recording layer 3. Also, the material forming the first protective layer 7 comprises a metal which is higher in adherence property with respect to the substrate 1a than the dielectric material forming the second protective layer 2 and therefore, peel-off or crack is not liable to occur.

As a material which can form the first protective layer 7, use can be made of one or more metal elements selected from a group comprising Fe, Ni, Co, Ti, Cr, Si and Al. If the layer thickness of the first protective layer 7 is made great, the transmission of moisture or oxygen can be prevented substantially completely even if the second protective layer 2 is absent. However, if the layer thickness of the first protective layer 7 is made great, there is a tendency that because of the high heat conductivity of the metal, heat is ready to escape during the recording and the recording sensitivity is reduced. Also, the metal film forming the first protective layer 7 has a smaller transmittance of recording light or reproducing light than the second protective layer 2 comprising said oxide or nitride and therefore, from this point as well, the recording sensitivity is ready to be reduced. Accordingly, the layer thickness of the first protective layer 7 is set to a thickness which will not reduce the recording sensitivity but may sufficiently improve the corrosion resistance. For example, where the layer thickness of the magnetic recording layer 3 is several hundred Å, the layer thickness of the first protective layer may preferably be of the order of 30–50 Å. At this time, the layer thickness of the second protective layer 2 is of the order of 400–1500 Å.

This opto-magnetic recording meidum is manufactured by first forming the first protective layer 7 on the substrate 1a and then successively forming the second protective layer 2 and the magnetic recording layer 3 by a film forming method such as the ion plating method, the sputtering method or the electron beam evaporation method in which the material components forming the first protective layer 7, the second protective layer 2 and the magnetic recording layer 3 are supplied from a single evaporation source or multiple evaporation sources.

Figure 2:
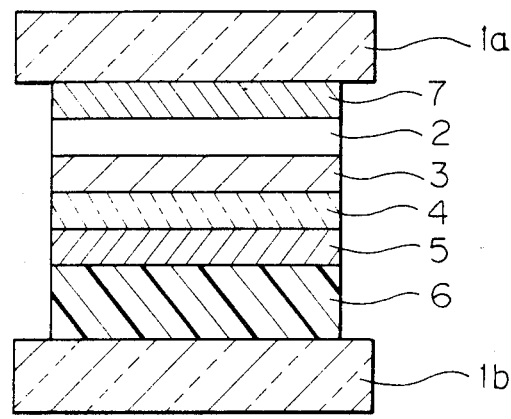
FIG. 2 is a schematic cross-sectional view showing another example of the construction of the opto-magnetic recording medium of the present invention.

The foregoing example is only for explaining the basic structure of the opto-magnetic recording meidum of the present invention, and the construction as shown in FIG. 2 is more preferable in practice, because in FIG. 1, the corrosion resistance of one surface of the magnetic recording layer 3 is not taken into account.

FIG. 2 is a schmatic cross-sectional view showing another example of the construction of the opto-magnetic recording meidum of the present invention, and this example is preferable in practice. This opto-magnetic recording meidum is of a structure in which a spacer layer 4 and a metal reflection layer 5 are successively formed on the magnetic recording layer 3 of the opto-magnetic recording medium shown in FIG. 1 and a protective substrate 1b is further cemented to the metal reflection layer 5 with an adhesive layer 6 interposed therebetween.

The spacer layer 4 is formed of a material similar to the material of the protective layer 2 and performs the function of improving the corrosion resistance and also performs the function of adjusting the sensitivity and the S/N ratio.

The metal reflection layer 5 performs the function of effectively utilizing the recording light and the reproducing light. That is, during the recording, the light transmitted through the magnetic recording layer 3 is reflected by the metal reflection layer and is again applied to the magnetic recording layer 3, whereby the recording efficiency is enhanced. Also, during the reproduction, part of the reproducing light is reflected by the magnetic recording layer 3 and the remainder of the reproducing light is transmitted through the magnetic recording layer 3 and is reflected by the reflection layer 5, and the two reflected lights are combined together. The former reflected light is subjected to the Kerr effect and the latter reflected light is subjected to the Faraday effect and therefore, by the detection of the combined lights, the apparent Kerr rotation angle is increased and the reproducing efficiency is improved. Au, Al, Cu, Ag or the like may be mentioned as a material usable for this reflection layer 5. The spacer layer 4 and the reflection layer 5 can be formed by the use of said material in a manner similar to that in which the magnetic recording layer 3 is formed.

EXAMPLE 1

Acrylic resin was used as the substrate 1a, a film of Si of about 50 Å was provided as the first protective layer 7 by the sputtering method, a film of $Si_3N_4$ of about 700 Å was provided as the second protective layer 2 by the reactive sputtering method, and a quarternary amorphous thin film of $Fe_{0.55}Co_{0.25}Gd_{0.10}Tb_{0.10}$ of about 200 Å was further formed as the magnetic recording layer 3. Subsequently, a film of $Si_3N_4$ of about 800 Å as the spacer layer 4 and a film of Al of about 500 Å as the reflection layer 5 were successively formed on the magnetic recording layer 3 by a method similar to the method whereby the first protective layer 7 was formed. Further, the substrate 1b formed of acrylic resin was cemented to the reflection layer 5 by using a silicon adhesive agent as the adhesive layer 6, whereby the opto-magnetic recording meidum of the present invention having the construction as shown in FIG. 2 was obtained.

When the Kerr rotation angle ($\theta k$) and the coercive force (Hc) of this opto-magnetic recording meidum were measured, the Kerr rotation angle was smaller by 1° than the Kerr rotation angle 4° of the conventional opto-magnetic recording medium formed by the same method as described above with the exception that the first protective layer 7 comprising a film of Si is not provided, but the coercive force was substantially equal to the coercive force Hc=1.5 KOe of the conventional recording medium.

Also, said two opto-magnetic recording mediums were left in a constant-temperature constant-humidity tank of temperature 45° C. and humidity 95%, whereafter a corrosion resistance test was effected to measure the variations in the Kerr rotation angles and the coercive forces thereof, with a result that the Kerr rotation angle and the coercive force of the conventional recording medium were decreased by 20% and 30%, respectively, whereas the Kerr rotation angle and the coercive force of the recording medium of the present invention were only decreased by 10% and 10%, respectively, and thus it was apparent that the corrosion resistance was improved.

EXAMPLE 2

An opto-magnetic recording medium was made in a similar amount to Example 1 with the exception that instead of a film of Si, a film of Cr was provided as the first protective layer 7 and a second protective layer comprising a film of SiO instead of a film of $Si_3N_4$ was provided, the Kerr rotation angle and the coercive force thereof were measured and a corrosion resistance test was carried out. The result was that as in Example 1, the initial values of the Kerr rotation angle and the coercive force of this recording meidum were substantially the same as those of the conventional opto-magnetic recording meidum and the corrosion resistance was greatly improved.

We claim:

1. An opto-magnetic recording medium comprising:
   a light-transmitting substrate;
   a first protective layer comprising a metal film provided in contact with said substrate and transmitting therethrough almost all of a light entering through said substrate;
   a second protective layer formed of a dielectric material provided on said first protective layer; and
   a magnetic recording layer provided on said second protective layer and having information recorded or reproduced thereon by the light transmitted through said substrate and said first and second protective layers wherein said protective layers act to inhibit corrosion of said magnetic layer.

2. An opto-magnetic recording medium according to claim 1, wherein said first protective layer is formed of one or more metals selected from among Fe, Ni, Co, Ti, Cr, Si and Al.

3. An opto-magnetic recording meidum according to claim 1, wherein the layer thickness of said first protective layer is in the range of 30 Å through 50 Å.

4. An opto-magnetic recording medium according to claim 1, wherein said second protective layer is formed of one of Sio, $SiO_2$, AlN, $Si_3N_4$ and $ZrO_2$.

5. An opto-magnetic recording medium according to claim 1, wherein the layer thickness of said second protective layer is in the range of 400 Å through 1500 Å.

6. An opto-magnetic recording meidum according to claim 1, wherein said magnetic recording layer comprises one of amorphous magnetic thin films of GdCo, GdFe, TbFe, DyFe, GdTbFe, TbDyFe and GdTbFeCo.

7. An opto-magnetic recording medium according to claim 1, wherein the layer thickness of said magnetic recording layer is in the range of 160 Å through 1000 Å.

8. An opto-magnetic recording medium according to claim 1, wherein said substrate comprises a plastic plate.

9. An opto-magnetic recording medium according to claim 1, further comprising a spacer layer and a reflection layer successively formed on said magnetic recording layer.

10. An opto-magnetic recording medium according to claim 1, further comprising another substrate cemented on said magnetic recording layer with an adhesive layer interposed therebetween.

* * * * *

UNITED STATES PATENT AND TRADEMARK OFFICE
CERTIFICATE OF CORRECTION

PATENT NO. : 4,579,777
DATED : APRIL 1, 1986
INVENTOR(S) : KAZUOKI HONGUU, ET AL.

It is certified that error appears in the above-identified patent and that said Letters Patent is hereby corrected as shown below:

COLUMN 5

Line 12, "amount" should read --manner--.

COLUMN 6

Line 7, "meidum" should read --medium--.
Line 17 "meidum" should read --medium--.

Signed and Sealed this

Twenty-sixth Day of April, 1988

Attest:

DONALD J. QUIGG

Attesting Officer

Commissioner of Patents and Trademarks